United States Patent
Konaka et al.

(10) Patent No.: US 8,421,648 B2
(45) Date of Patent: Apr. 16, 2013

(54) WRONG-WAY-TRAVEL WARNING DEVICE AND WRONG-WAY-TRAVEL WARNING METHOD

(75) Inventors: Daisuke Konaka, Toyota (JP); Masaki Nakamura, Okazaki (JP); Koichi Nakao, Tokyo (JP); Tomoaki Ishikawa, Okazaki (JP); Naoto Miura, Nagoya (JP); Masaki Yoshida, Okazaki (JP); Motoki Kanba, Okazaki (JP); Kiyoshi Tsurumi, Obu (JP)

(73) Assignees: Toyota Jidosha Kabushiki Kaisha, Toyota (JP); Aisin AW Co., Ltd., Anjo (JP); Denso Corporation, Kariya (JP)

( * ) Notice: Subject to any disclaimer, the term of this patent is extended or adjusted under 35 U.S.C. 154(b) by 186 days.

(21) Appl. No.: 12/671,291

(22) PCT Filed: Apr. 9, 2009

(86) PCT No.: PCT/JP2009/057278
§ 371 (c)(1), (2), (4) Date: Dec. 27, 2010

(87) PCT Pub. No.: WO2009/125815
PCT Pub. Date: Oct. 15, 2009

(65) Prior Publication Data
US 2011/0121992 A1    May 26, 2011

(30) Foreign Application Priority Data
Apr. 11, 2008 (JP) .................. 2008-103498

(51) Int. Cl.
*G08G 1/00* (2006.01)
(52) U.S. Cl.
USPC ............................ 340/901; 340/438; 340/540
(58) Field of Classification Search .................. 701/530, 701/435; 702/151; 340/905, 901, 438, 540
See application file for complete search history.

(56) References Cited

U.S. PATENT DOCUMENTS

| | | | | |
|---|---|---|---|---|
| 3,824,469 A | * | 7/1974 | Ristenbatt | 342/42 |
| 5,043,902 A | * | 8/1991 | Yokoyama et al. | 701/442 |
| 5,390,122 A | * | 2/1995 | Michaels et al. | 701/530 |

FOREIGN PATENT DOCUMENTS

| | | |
|---|---|---|
| JP | A-09-039602 | 2/1997 |
| JP | A-09-081757 | 3/1997 |
| JP | A-2002-312897 | 10/2002 |
| JP | A-2006-030116 | 2/2006 |
| JP | A-2006-344164 | 12/2006 |
| JP | A-2007-139531 | 6/2007 |
| JP | A-2007-140883 | 6/2007 |
| JP | A-2007-293390 | 11/2007 |
| JP | A-2008-276590 | 11/2008 |

OTHER PUBLICATIONS

International Search Report issued in International Application No. PCT/JP2009/057278; Mailed on Jun. 30, 2009.

* cited by examiner

*Primary Examiner* — Daniel Wu
*Assistant Examiner* — Frederick Ott
(74) *Attorney, Agent, or Firm* — Oliff & Berridge, PLC (57) ABSTRACT

A wrong-way-travel warning device comprising a vehicle speed detecting part configured to detect a vehicle speed of a vehicle, a part configured to detect a position of the vehicle, an angle detecting part configured to detect an angle of a vehicular longitudinal direction of the vehicle relative to a lane marking if the vehicle speed of the vehicle becomes less than or equal to a predetermined value, and a warning part configured to issue a warning to an occupant if the position of the vehicle is on a main lane of a highway and if the angle becomes about 90 degrees, is provided.

3 Claims, 10 Drawing Sheets

YAW ANGLE

FIG.6B

YAW ANGLE: ZERO

WRONG-WAY-TRAVEL WARNING DEVICE AND WRONG-WAY-TRAVEL WARNING METHOD

TECHNICAL FIELD

The present invention relates to a wrong-way-travel warning device and a wrong-way-travel warning method which issue a warning if there is a possibility that a vehicle may travel the wrong-way on a road whose travel direction is defined.

BACKGROUND ART

A driver drives a vehicle on a road in accordance with a predetermined traveling direction. However, in such a case where there are plural lanes each way, there are some cases where a driver drives a vehicle the wrong-way on the road which the driver has been driving even if the driver intended in the first place to make a U-turn to get to an opposing lane. In this respect, a navigation device which detects wrong-way-travel and warns a vehicle occupant of the wrong-way-travel has been proposed (see Patent Document 1 for example). Patent Document 1 describes a navigation device which previously stores information about a wrong-way-travel prohibited road in a database and issues a warning to a driver if a vehicle travels in an opposite direction from a forward direction of the wrong-way-travel prohibited road.

A U-turn detecting device configured to detect a U-turn has also been proposed (see Patent Documents 2, 3 for example). Patent Document 2 describes a U-turn detecting device configured to determine that a vehicle has made a U-turn if a turning angle of the vehicle is within a predetermined range and an average curvature during the turning is less than a threshold value. Patent Document 3 describes a U-turn detecting device configured to detect that a vehicle has made a U-turn if both a turnaround of a traveling direction of the vehicle and a crossing of a lane marking are detected within a predetermined time duration.

A wrong-way-travel detecting device configured to take an image of a forward region by a front camera mounted on a vehicle and to detect a wrong-way-travel based on image processing has also been proposed (see Patent Document 4 for example). Patent Document 4 describes a wrong-way-travel detecting device. The wrong-way-travel detecting device is configured to detect a wrong-way-travel, if a center divider is detected from the image, based on color information of a traffic sign and sizes of traffic signs on the left hand side and the right hand side of a road. If a center divider is not detected from the image, the wrong-way-travel detecting device is configured to compare the number of lanes stored in road map information and the number of lanes detected from the image data, and then detect a wrong-way-travel if the number of lanes at the right side of the lane where the vehicle is traveling is less than the number of lanes at the left side of the lane where the vehicle is traveling.

However, the methods described in Patent Documents 1 and 4 do not detect a wrong-way-travel until the vehicle actually travels in the opposite direction. Thus, there is a problem in that it is difficult to issue a warning to the driver before the turnaround or before a start of the wrong-way-travel. Similarly, in the case where the U-turn is detected as described in Patent Document 2 or 3, as the vehicle had already turned around toward the opposite direction when the U-turn has been detected, it is difficult to issue a warning to the driver before the turnaround or before a start of the wrong-way-travel. Once the vehicle turns around toward the opposite direction, as it can be difficult for the vehicle to turn back toward the forward direction due to the presence of other vehicles traveling in the forward direction, it is considered to be preferable to issue a warning to the driver before the vehicle turns around.

[Patent Document 1] Japanese Patent Publication No. 2007-139531
[Patent Document 2] Japanese Patent Publication No. 2006-030116
[Patent Document 3] Japanese Patent Publication No. 2006-344164
[Patent Document 4] Japanese Patent Publication No. 2007-140883

DISCLOSURE OF THE INVENTION

Problems to be Solved by the Invention

In view of the above-mentioned problems, it is an object of the present invention to provide a wrong-way-travel warning device and a wrong-way-travel warning method capable of detecting a possibility of a wrong-way-travel before a start of the wrong-way-travel.

Means for Solving Problems

To achieve the object above, an embodiment of the present invention provides a wrong-way-travel warning device for detecting a possibility of a wrong-way-travel, comprising a vehicle speed detecting part configured to detect a vehicle speed of a vehicle, a part configured to detect a position of the vehicle, an angle detecting part configured to detect an angle of a vehicular longitudinal direction of the vehicle relative to a lane marking if the vehicle speed of the vehicle becomes less than or equal to a predetermined value, and a warning part configured to issue a warning to an occupant if the position of the vehicle is on a main lane of a highway and if the angle becomes about 90 degrees.

According to the embodiment of the present invention, as the wrong-way-travel warning device issues a warning to an occupant if the angle becomes about 90 degrees, the wrong-way-travel warning device can issue a warning that there is a possibility of a wrong-way-travel before completing a U-turn, i.e. before a start of the wrong-way-travel.

Effect of the Invention

It is possible to provide a wrong-way-travel warning device and a wrong-way-travel warning method capable of detecting a possibility of a wrong-way-travel before a start of the wrong-way-travel.

EXPLANATION OF REFERENCE SIGNS 20 control part
21 vehicle speed sensor
22 gyro sensor
23 map DB
24 GPS receiver
26 rearview camera
31 wrong-way-travel determining part
32 alarm requesting part
100 wrong-way-travel warning device

BEST MODE FOR CARRYING OUT THE INVENTION

With reference to the figures, the best mode for carrying out the present invention is described below with embodiments.

First Embodiment

On a main lane of a highway, a wrong-way-travel warning device 100 of the present embodiment is configured to detect a turning angle while setting as a reference a vehicular longitudinal direction at the time when a vehicle speed becomes less than or equal to a predetermined speed. The wrong-way-travel warning device 100 is also configured to detect whether there is a possibility that a vehicle may make a wrong-way-travel by detecting that the turning angle has become a predetermined value (about 90 degrees for example). It is considered that a possibility of making a U-turn on the main lane of the highway is very low due to its structure for preventing U-turns. Therefore, it is possible to reliably detect whether there is a possibility that a vehicle may make a wrong-way-travel on the highway if the turning angle exceeds the predetermined value in the state that the vehicle speed is less than or equal to the predetermined speed on the main lane of the highway.

A highway is connected to ramps for entering the highway, or a side lane, a diverging lane or a merging lane for diverging from or merging into an ordinary road, other lanes on the same highway, or other highways (hereinafter simply called "side lane", including the ramps). A vehicle can travel on the side lane. The side lane may have a bend therein of over 90 degrees or a spiral structure. A highway may also have a rest area where a vehicle can make a left/right turn or a turnaround in the state that the vehicle speed is less than or equal to the predetermined speed. However, the wrong-way-travel warning device of the present embodiment does not make a detection of a possibility of a wrong-way-travel (i.e. a false detection) even if the turning angle exceeds the predetermined value in the state of low speed. This is because the wrong-way-travel warning device of the present embodiment does not detect whether there is a possibility of a wrong-way-travel in the side lane or the rest area.

Figure 1:
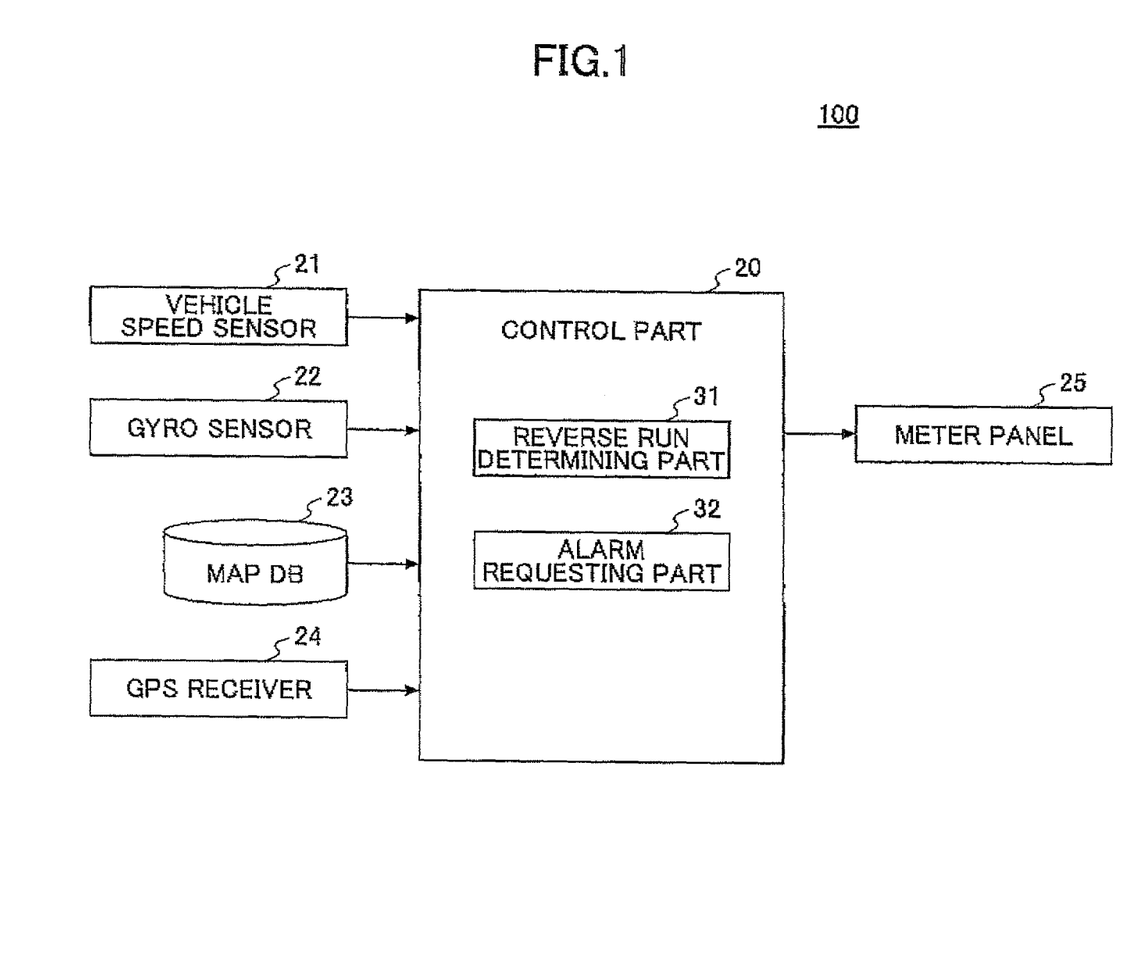
FIG. 1 is an example of a block diagram of a wrong-way-travel warning device (a first embodiment).

FIG. 1 shows a block diagram of the wrong-way-travel warning device 100 of the present embodiment. The wrong-way-travel warning device 100 is controlled by a control part 20. The control part 20 is connected to a vehicle speed sensor 21, a gyro sensor 22, a map DB (database) 23, a GPS (Global Positioning System) receiver 24, and a meter panel 25 via a CAN (Controller Area Network) or a dedicated line. The control part 20 is comprised of, for example, a computer including a CPU, a RAM, a ROM and an input/output interface. For example, a navigation ECU (Electronic Control Unit) configured to control a navigation system can be utilized as the wrong-way-travel warning device 100 as well. The navigation ECU detects a position, speed, and travel direction of a vehicle, and thus equips functions required for an implementation of the wrong-way-travel warning device 100. This can save an in-car space and prevent weight gain.

The vehicle speed sensor 21 translates a change in magnetic flux at the time when a salient thereof positioned at equally spaced intervals on the circumference of a rotor mounted to each wheel of a vehicle passes the sensor, to a pulse waveform, and measures a wheel speed for each wheel based on the number of pulses per unit time. The vehicle speed is calculated by multiplying the wheel speed by a correction value defined based on an outer diameter of a tire or an interval between the salients.

The gyro sensor 22 is, for example, a vibrating reed type gyro sensor formed by a micro-machining process. The gyro sensor 22 can measure Coriolis force which occurs in response to a turning speed of a vehicle as a voltage signal in response to a change in potential between electrodes. A temporal integration of a turning speed i.e. a yaw rate results in a turning angle. Therefore, it is possible to detect a turning angle by a temporal integration of an output of the gyro sensor 22.

The map DB 23 is comprised of a HDD (Hard Disk Drive), a flash memory, or the like. The map DB 23 stores road map information associated with positional information such as latitude and longitude. The road map information is a tabular database configured to associate link information about a link constituting a road and node information about a node (a point positioned on an intersection or a point positioned at predetermined intervals on a link) connecting links. The link information includes a link length, a width of road, a node to be connected, a connection direction, or the like. Thus, an actual road network can be reproduced by the road map information. The map DB 23 also registers for each link a road category such as a highway or an ordinary road, and in the case of a highway, the map DB 23 registers information for discerning a main lane, a side lane, and a rest area. Although there are cases where the term "car-only road" is used as a term having the similar meaning as the term "highway", it will be assumed that the present embodiment utilizes the term "highway" without distinguishing between the term "highway" and the term "car-only road".

The GPS receiver 24 is configured to acquire preferably four or more GPS satellites orbiting the Earth, and to detect a position of a vehicle (latitude, longitude, and altitude) based on arrival times of radio waves from respective GPS satellites.

By correcting for variations in measuring results of GPS signals based on an FM broadcast radio wave sent from a reference station whose position is known, the GPS receiver 24 can detect a more accurate position of the vehicle.

The control part 20 is configured to accumulate travel distances detected by the vehicle speed sensor 21 in a direction detected by the gyro sensor 22 while setting positional information of a vehicle detected by the GPS receiver 24 as a starting point, and to accurately estimate a position of the vehicle. The control part 20 is also configured to correct the position of the vehicle through a map matching which watches the position of the vehicle to a most probable road relative to the estimated position by using a road map around the vehicle.

The meter panel 25 is configured to issue a warning to a driver if a wrong-way-travel is detected, by setting an alarm off, by causing a speaker to output a warning message, or by displaying on a display part such as a liquid crystal display, a head-up display, and so on, a warning message or an icon representing a wrong-way-travel, or the like. The meter panel 25 may output either an auditory alarm or a visual alarm.

The control part 20 also has a wrong-way-travel determining part 31 configured to determine whether there is a possibility that a vehicle may make a wrong-way-travel and an alarm requesting part 32 configured to request the meter panel 25 to issue a warning if the wrong-way-travel determining part 31 of the wrong-way-travel warning device 100 determines that there is a possibility that the vehicle may make a wrong-way-travel. The wrong-way-travel determining part 31 and the alarm requesting part 32 are implemented by a program executable by a CPU or hardware such as ASIC (Application Specific Integrated Circuit) or the like.

Figure 2:
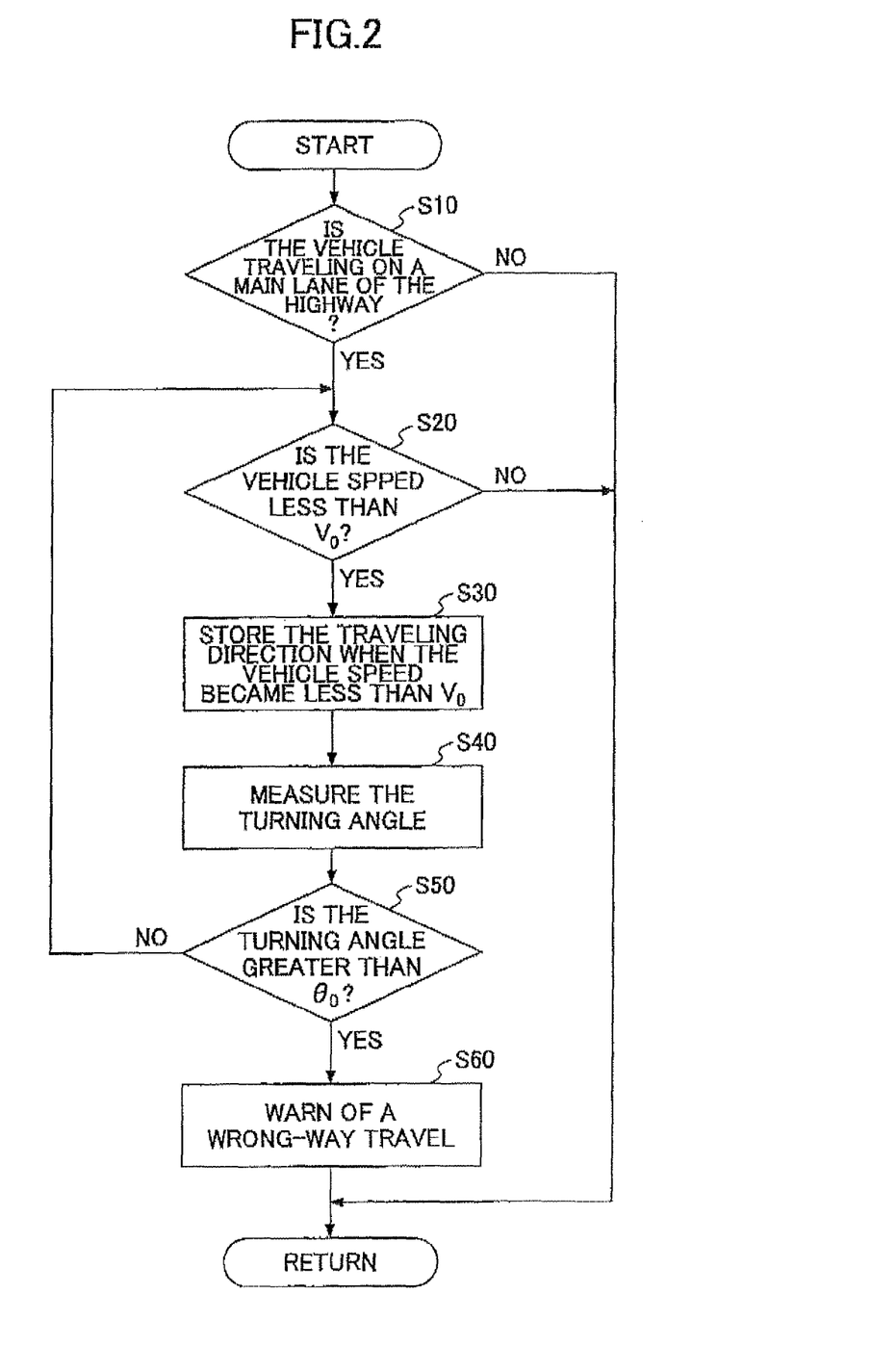
FIG. 2 is a flow chart showing a procedure in which the wrong-way-travel warning device detects a wrong-way-travel (the first embodiment).

Referring to a flow chart in FIG. 2, a procedure in which the wrong-way-travel warning device 100 detects a wrong-way-travel is illustrated. The flow chart in FIG. 2 is initiated, for example, when a vehicle proceeds onto a highway, and is repeatedly executed at predetermined time intervals.

Upon proceeding onto the highway, the wrong-way-travel determining part 31 determines whether the vehicle is traveling on a main lane of the highway based on a position of the vehicle (S10). The wrong-way-travel determining part 31 may make such a determination by, for example, receiving information that the vehicle is traveling on the main lane of the highway from a communication part installed on a roadside. If the vehicle is not traveling on the main lane of the highway (NO in S10), the procedure of FIG. 2 terminates.

If the vehicle is traveling on the main lane of the highway (YES in S10), the wrong-way-travel determining part 31 determines whether the vehicle speed detected by the vehicle speed sensor 21 is less than a vehicle speed determining threshold value $V_0$ (S20). The vehicle speed determining threshold value $V_0$ is a predetermined number. As there is a need to significantly decelerate a vehicle's speed in order to make a U-turn with the vehicle, this general vehicle speed, i.e. the speed at which a vehicle must decelerate to in order to make a U-turn, is set as the vehicle speed determining threshold value (For example, $V_0$=20 [km/h]). Unless the vehicle speed is less than the vehicle speed determining threshold value $V_0$ (NO in S20), the procedure of FIG. 2 terminates.

If the vehicle speed is less than the vehicle speed determining threshold value $V_0$ (YES in S20), the wrong-way-travel determining part 31 records in memory the traveling direction of the vehicle at the time when the vehicle speed became less than the vehicle speed determining threshold value $V_0$ i.e. the traveling direction at the time of determination in step S20 (S30). In this way, the traveling direction at the time when the vehicle speed became less than the vehicle speed determining threshold value $V_0$ is set to zero degrees (a reference value). A processing in step S30 is executed only once so that the traveling direction is not updated as long as the vehicle speed is less than the vehicle speed determining threshold value $V_0$.

Then, the wrong-way-travel warning device 100 starts to measure a turning angle of the vehicle on the basis of the traveling direction set as zero degrees (S40). As described above, the turning angle can be detected by temporal integrating outputs of the gyro sensor 22. Thus, the turning angle can be detected by, for example, accumulating yaw rates at short time intervals.

Figure 3A:
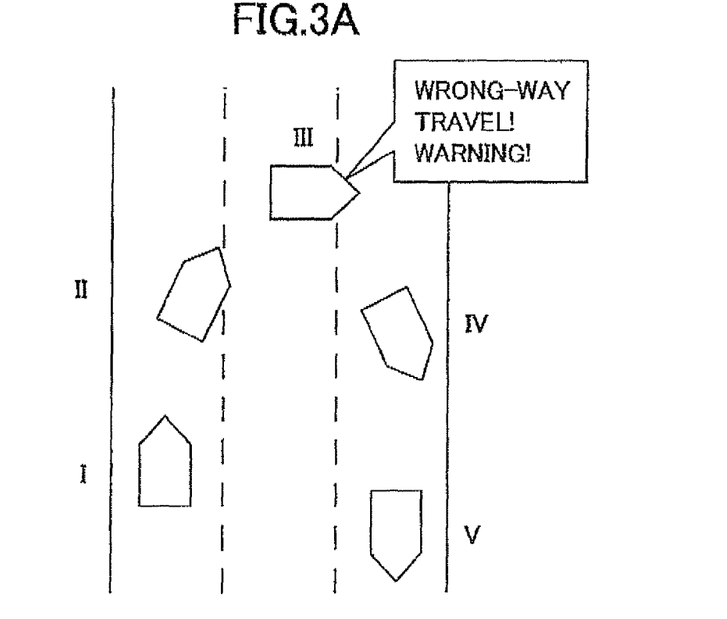
FIG. 3A is an example of a diagram diagrammatically showing a process in which a vehicle makes a U-turn.
Figure 3B:
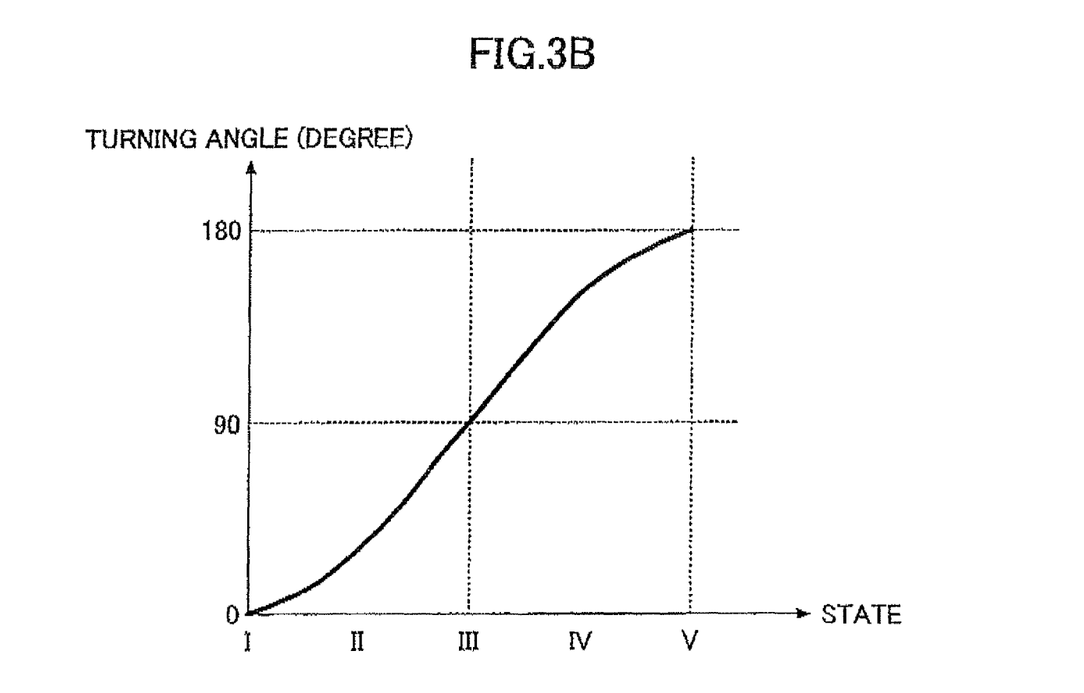
FIG. 3B is a graph showing an example of the change in turning angle of the vehicle during the process in which the vehicle makes the U-turn.

FIG. 3A diagrammatically shows a process in which a vehicle makes a U-turn. FIG. 3B shows an example of the change in turning angle of the vehicle during the process in which the vehicle makes the U-turn. In FIG. 3A, the state at the time when the vehicle speed became less than the vehicle speed determining threshold value $V_0$ is represented as a state "I". Thus, in FIG. 3B, the turning angle at the state "I" is zero.

If the vehicle continues the U-turn and the vehicle's state becomes a state "III" by way of a state "II", the vehicular longitudinal direction of the vehicle is generally directed to a road width direction. Thus, the turning angle in the state "III" is about 90 degrees. If the vehicle further continues the U-turn and a state becomes a state "V" by way of a state "IV", the vehicle is directed toward an opposite direction of the road. Thus, the turning angle in the state "V" is about 180 degrees.

Referring back to FIG. 2, the wrong-way-travel determining part 31 repeatedly determines whether the turning angle exceeds a turnaround determining threshold value $\theta_0$ unless the vehicle speed exceeds the vehicle speed determining threshold value $V_0$ (S50). If the turnaround determining threshold value $\theta_0$ is set to 90 degrees, the wrong-way-travel determining part 31 detects a wrong-way-travel of the vehicle at the state "III" of FIG. 3A. If the vehicle speed becomes greater than or equal to the vehicle speed determining threshold value $V_0$ before the turning angle exceeds the turnaround determining threshold value $\theta_0$, the procedure in FIG. 2 terminates. Thus, for example, even if the vehicle gets involved in a traffic jam, if the vehicle speed increases before the turning angle exceeds the turnaround determining threshold value $\theta_0$, the wrong-way-travel determining part 31 can prevent a false detection of a possibility of a wrong-way-travel.

If the turning angle exceeds the turnaround determining threshold value $\theta_0$ (YES in S50), the wrong-way-travel determining part 31 determines that the vehicle is about to make a wrong-way-travel, and causes the alarm requesting part 32 to issue a warning to the driver via at least one of an auditory and a visual sense (S60).

It is preferable to issue a warning to the driver before the vehicle starts to make a wrong-way-travel even if a possibility of a wrong-way-travel is not always certain. Thus, for example, it is possible to set the turnaround determining threshold value $\theta_0$ to around 80 degrees. On a main lane of a highway, it is rare for a turning angle to become greater than or equal to 80 degrees at a speed below a predetermined speed. Thus, it is not likely to faultily determine a mere lane change as a possible wrong-way-travel and then issue an unnecessary warning. It is also possible to set the turnaround determining threshold value $\theta_0$ to 100 degrees in, order to more reliably detect whether there is a possibility of a wrong-way-travel.

The wrong-way-travel warning device 100 of the present embodiment detects whether a vehicle is traveling on a main lane of a highway, and detects a possibility of a wrong-way-travel based on a vehicle speed and a turning angle only if the vehicle is traveling on the main lane of the highway. Thus, the wrong-way-travel warning device 100 can issue a warning to a driver before the vehicle starts the wrong-way-travel or just after the vehicle has started the wrong-way-travel, and prevent the wrong-way-travel on a highway from happening.

[In the Case of a K-Turn (Due to the Number of Lanes)]

As shown in FIG. 3A, as most highways have plural lanes, it is often the case that it is possible to make a U-turn without making a K-turn if there are, for example, three or more lanes. In such a case, even if there are four or more lanes, the method of the present embodiment can detect whether there is a possibility of a wrong-way-travel. However, in the case where a vehicle is traveling on a highway with two or less lanes or in the case where a vehicle with a large turning radius makes a U-turn on a highway with three lanes, the vehicle may make a X-turn. Even if a vehicle makes a K-turn, the wrong-way-travel warning device 100 can similarly detect whether there is a possibility of a wrong-way-travel.

Figure 4A:
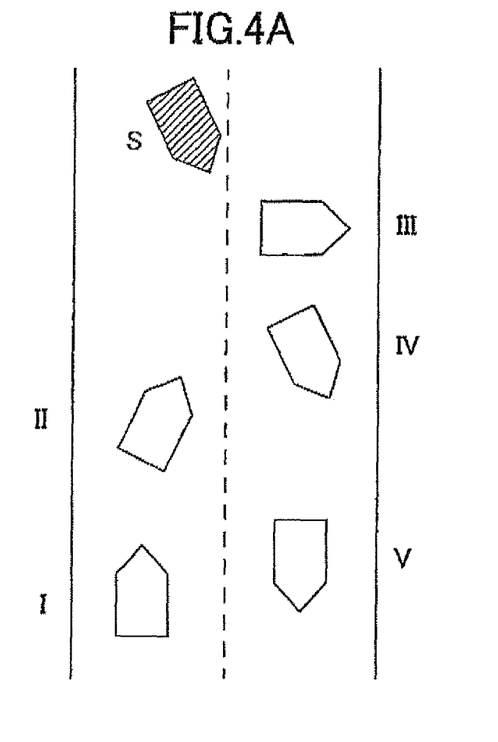
FIG. 4A is another example of a diagram diagrammatically showing a process in which a vehicle makes a U-turn.
Figure 4B:
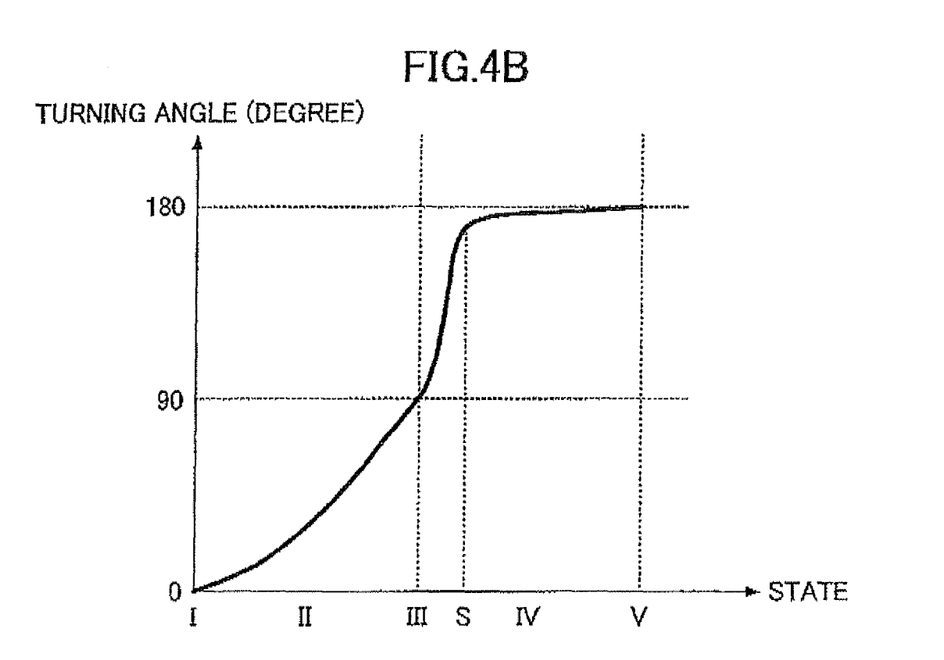
FIG. 4B is another graph showing an example of the change in turning angle of the vehicle during the process in which the vehicle makes the U-turn (including a K-turn).

FIG. 4A diagrammatically shows a process in which a vehicle makes a U-turn. FIG. 4B shows an example of the change in turning angle of the vehicle during the process in which the vehicle makes the U-turn. In FIG. 4, an explanation about the same parts as those in FIG. 3 is omitted. A highway shown in FIG. 4A has two lanes each way. Consequently, the vehicle will be in a state "S" by making a K-turn after the state "III". As a turning angle in the state "S" is already close to 180 degrees, even if the turnaround determining threshold value $\theta_0$ is set to, for example, 100 degrees, the wrong-way-travel determining part 31 can detect whether there is a possibility of a wrong-way-travel in a state between the state "III" and the state "S".

As the turning angle inevitably becomes horizontal before the start of a wrong-way-travel, if the turnaround determining threshold value $\theta_0$ is set to for example, 80~90 degrees, the wrong-way-travel determining part 31 can detect whether there is a possibility of a wrong-way-travel regardless of a subsequent K-turn.

If a vehicle makes a K-turn, a shift position sensor indicates a "backward" signal. Thus, the wrong-way-travel warning device 100 can detect a K-turn based on the signal from the shift position sensor, and prohibit the determination in step S20 even if the vehicle speed becomes greater than or equal to the vehicle speed determining threshold value $V_0$ in the backward driving. In this way, even if the vehicle speed becomes greater than or equal to the vehicle speed determining threshold value $V_0$ in the backward driving, the wrong-way-travel warning device 100 can detect whether there is a possibility of a wrong-way-travel around the time of K-turn.

Second Embodiment

Figure 5:
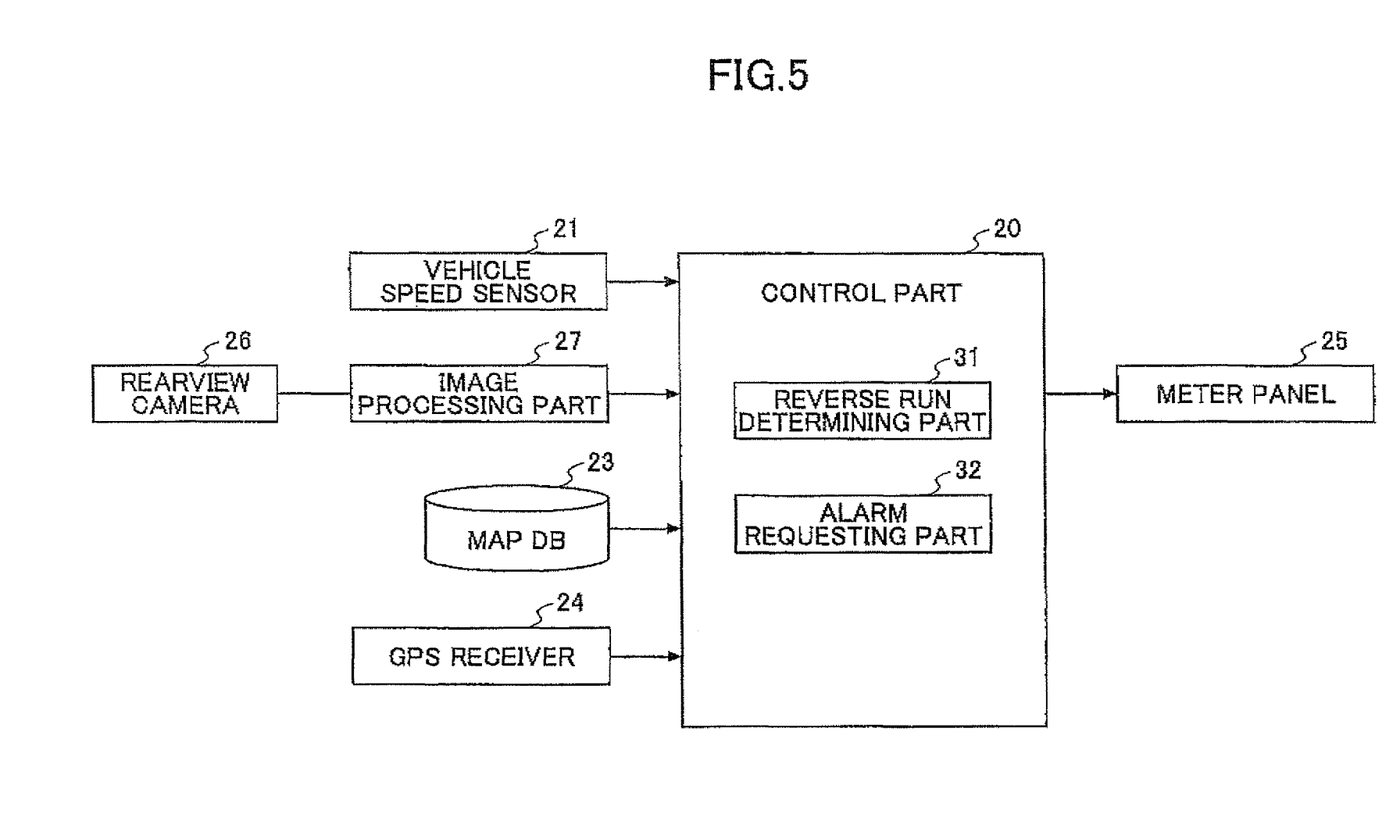
FIG. 5 is an example of a block diagram of a wrong-way-travel warning device (a second embodiment).

This embodiment explains about a wrong-way-travel warning device 100 configured to detect whether there is a possibility of a wrong-way-travel by processing an image captured by the rearview camera 26. There is a lane marking marked on a road for marking off driving lanes on a highway. The lane marking has a rectilinear shape parallel to the driving lanes. Thus, it is considered that a vehicular longitudinal direction of a vehicle inevitably goes through a state of forming a right angle with the lane marking before the vehicle makes a U-turn and starts a wrong-way-travel. Thus, the wrong-way-travel warning device 100 can detect whether there is a possibility of a wrong-way-travel by monitoring an angle of the lane marking captured by the rearview camera 26.

FIG. 5 shows a block diagram of the wrong-way-travel warning device 100 of the present embodiment. In FIG. 5, the same component parts as those in FIG. 1 are referenced by the same reference number and their explanations are omitted.

The wrong-way-travel warning device 100 of the present invention includes a rearview camera 26 and an image processing part 27.

The rearview camera 26 is arranged roughly in the center of a rear bumper of the vehicle or roughly in the upper center of a rear window so that its optical axis points backward and somewhat downward. The rearview camera 26 is comprised of an imaging part incorporating a photoelectric conversion element such as CMOS (Complementary Metal Oxide Semiconductor) or the like. The rearview camera 26 reads out a voltage of the photoelectric conversion element, and converts the analog signals to digital data having predetermined brightness tones (hereinafter called "image data"). Although the rearview camera 26 is a monochrome camera, the rearview camera 26 can be a camera capable of taking a color image or a stereo camera. The rearview camera 26 captures the image data within a predetermined backward range at the frame speed of 15~30 frames per second, and stores the image data into a memory in sequence.

Figure 6A:
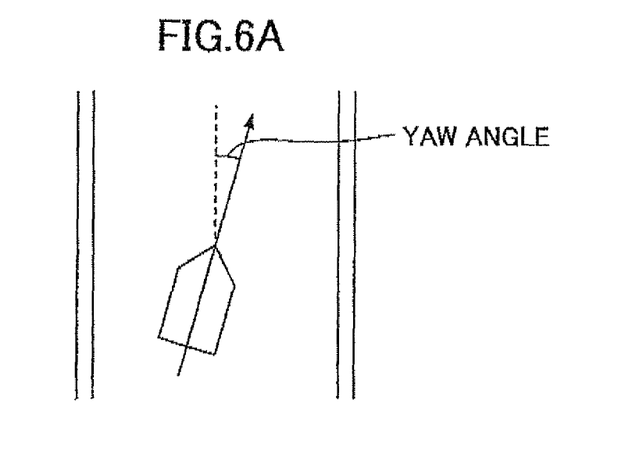
FIG. 6A is an example of a diagram diagrammatically showing a yaw angle of a vehicular longitudinal direction relative to a lane marking.

The image processing part 27 reads out the image data stored in the memory, recognizes a lane marking, and detects an angle of a vehicular longitudinal direction, of the vehicle relative to the lane marking (hereinafter simply called "yaw angle"). FIG. 6A is a diagram diagrammatically showing a yaw angle of a vehicular longitudinal direction of a vehicle relative to a lane marking. The lane marking is detected by using a well known method in the field of, for example, LKAS (Lane Keeping Assist System) or the like. Specifically, as a piece of the lane marking has an edge which serves as a high frequency component relative to a road surface, differentiation of brightness values in the image data in the horizontal direction and the vertical direction results in peaks at both ends of a white line, and thus an edge line connecting those peaks can be estimated. Plural candidate line pairs for the lane marking are extracted from plural estimated edge lines in consideration of a width of the line marking, and then a piece of a white line recognized as a white line is selected from the plural candidate line pairs for the lane marking by using a method such as matching based on features like a threshold value defined by a brightness or a contrast relative to a road surface, a threshold value of a width, being rectilinear shape, or the like. A linear expression of either or both of a left and a right captured white line is obtained by applying Hough transformation to plural edges of the selected white line.

Figure 6B:
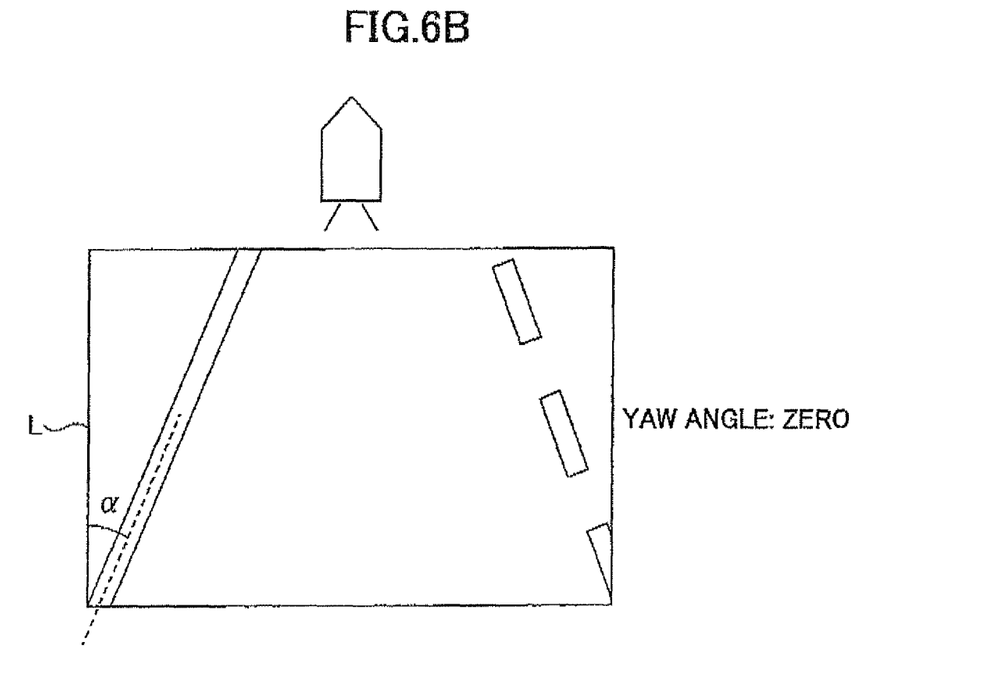
FIG. 6B is an example of a diagram illustrating captured image data and a detection of the vehicular longitudinal direction (yaw angle: 0 degrees).
Figure 6C:
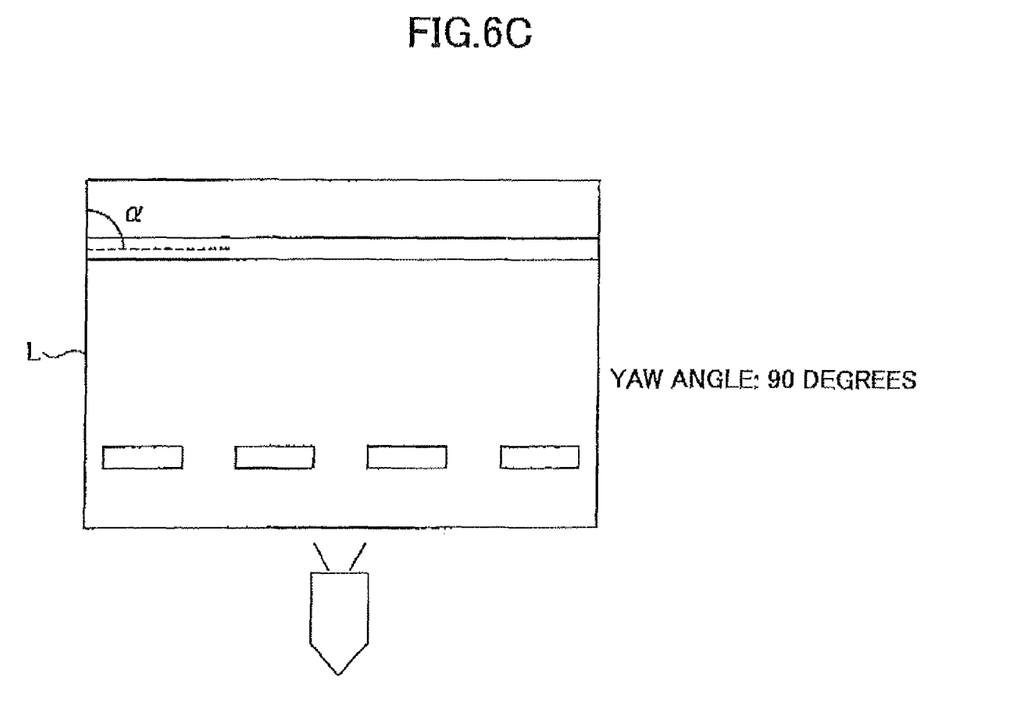
FIG. 6C is an example of a diagram illustrating captured image data and a detection of the vehicular longitudinal direction (yaw angle: 90 degrees).

FIGS. 6B and 6C are diagrams illustrating the captured image data and a detection of the vehicular longitudinal direction. If the vehicular longitudinal direction of the vehicle is nearly parallel to the lane marking (the yaw angle is zero degrees), the image data becomes like that shown in FIG. 6B. If the vehicular longitudinal direction of the vehicle is nearly perpendicular to the lane marking (the yaw angle is 90 degrees), the image data becomes like that shown in FIG. 6C. Here, as an angle formed by the optical axis of the rearview camera 26 and the road surface remains fixed, an angle α formed by the captured lane marking and, for example, a predetermined reference line L of the image data, is uniquely defined in an one-to-one relationship with the yaw angle.

Therefore, if the angle α formed by the captured lane marking and the reference line L is previously registered in relation to the yaw angle, the wrong-way-travel warning device 100 can detect a vehicular longitudinal direction (a yaw angle) from the angle α formed by the captured lane marking and the reference line L. In FIGS. 6B and 6C, a vertical line in the image data is set as the reference line L.

Therefore, the wrong-way-travel determining part 31 can detect whether there is a possibility of a wrong-way-travel by determining a yaw angle of the vehicle from the angle α and comparing the yaw angle with the turnaround determining threshold value $\theta_0$.

Figure 7:
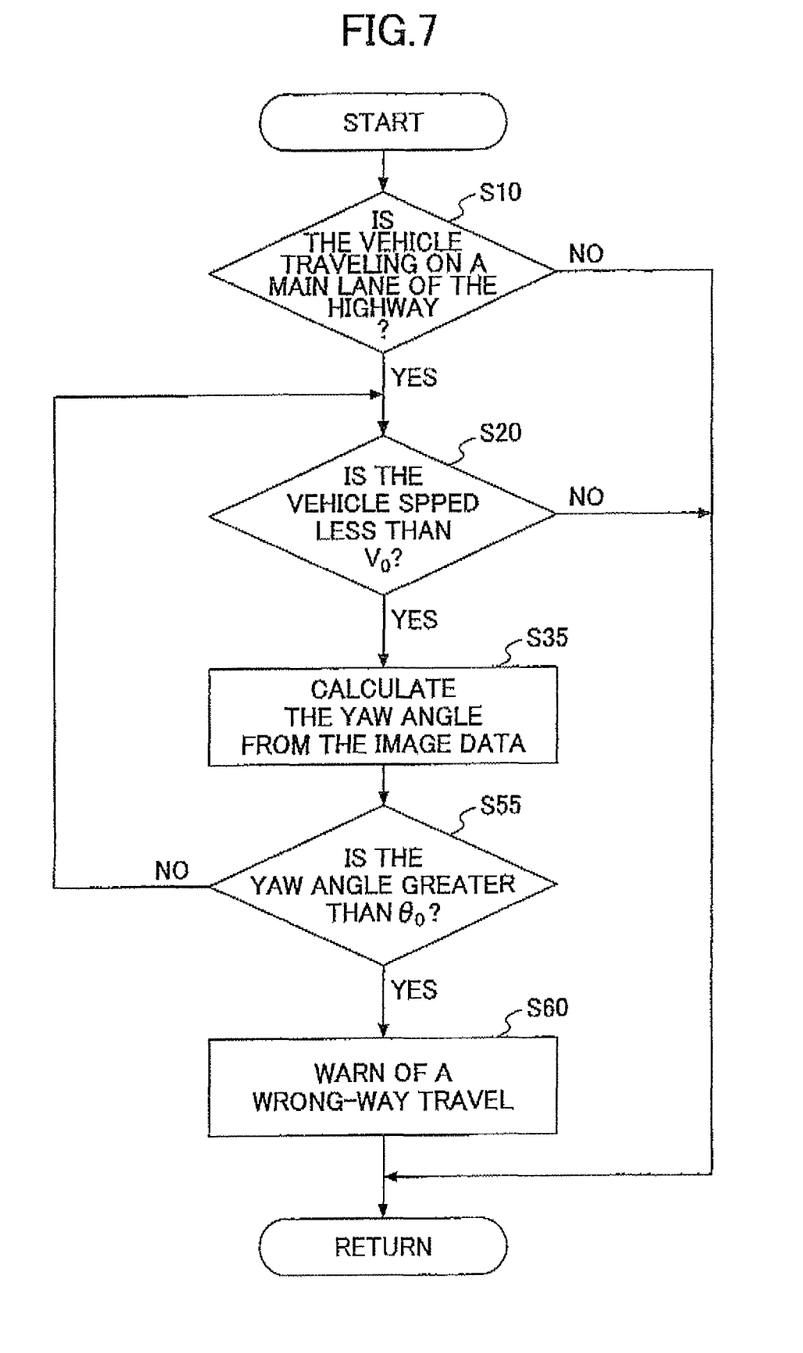
FIG. 7 is a flow chart showing a procedure in which the wrong-way-travel warning device detects a wrong-way-travel (the second embodiment).

Referring to the flow chart shown in FIG. 7, a procedure in which the wrong-way-travel warning device 100 detects a wrong-way-travel is illustrated. The flow chart of FIG. 7 is initiated, for example, when a vehicle proceeds onto a highway, and is repeatedly executed at predetermined time intervals.

Upon proceeding onto the highway, the wrong-way-travel determining part 31 of the wrong-way-travel warning device 100 determines whether the vehicle is traveling on a main lane of the highway based on a position of the vehicle (S10). If the vehicle is not traveling on the main lane of the highway (NO in S10), the procedure of FIG. 2 terminates.

If the vehicle is traveling on the main lane of the highway (YES in S10), the wrong-way-travel determining part 31 determines whether the vehicle speed detected by the vehicle speed sensor 21 is less than a vehicle speed determining threshold value $V_0$ (S20). The determination in step S20 is similar to that of the first embodiment.

If the vehicle speed is less than the vehicle speed determining threshold value $V_0$ (YES in S20), the wrong-way-travel determining part 31 calculates a yaw angle from the angle α detected from the image data (S35). As the image data are stored into the memory in sequence, the wrong-way-travel determining part 31 calculates yaw angles from each of the image data.

Then, the wrong-way-travel determining part 31 determines whether the yaw angle exceeds the turnaround determining threshold value $\theta_0$ (S55).

Figure 8A:
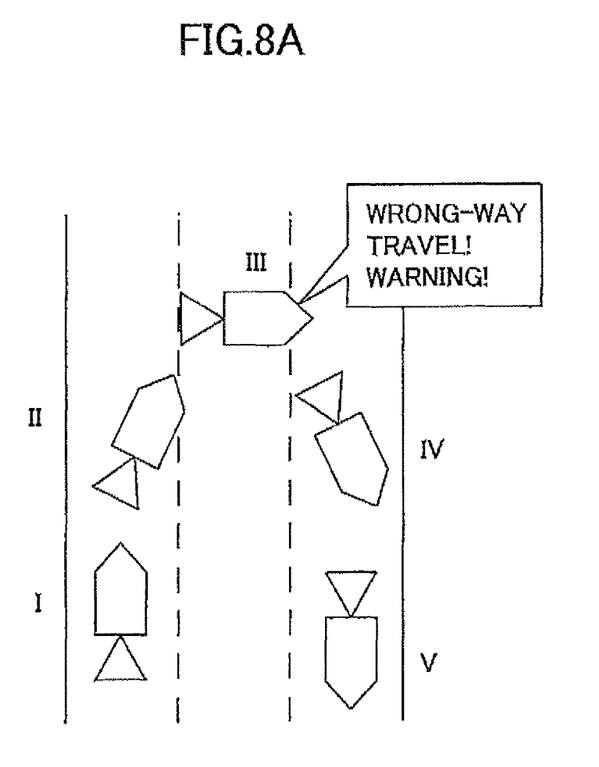
FIG. 8A is an example of a diagram diagrammatically showing a process in which the vehicle makes a U-turn.
Figure 8B:
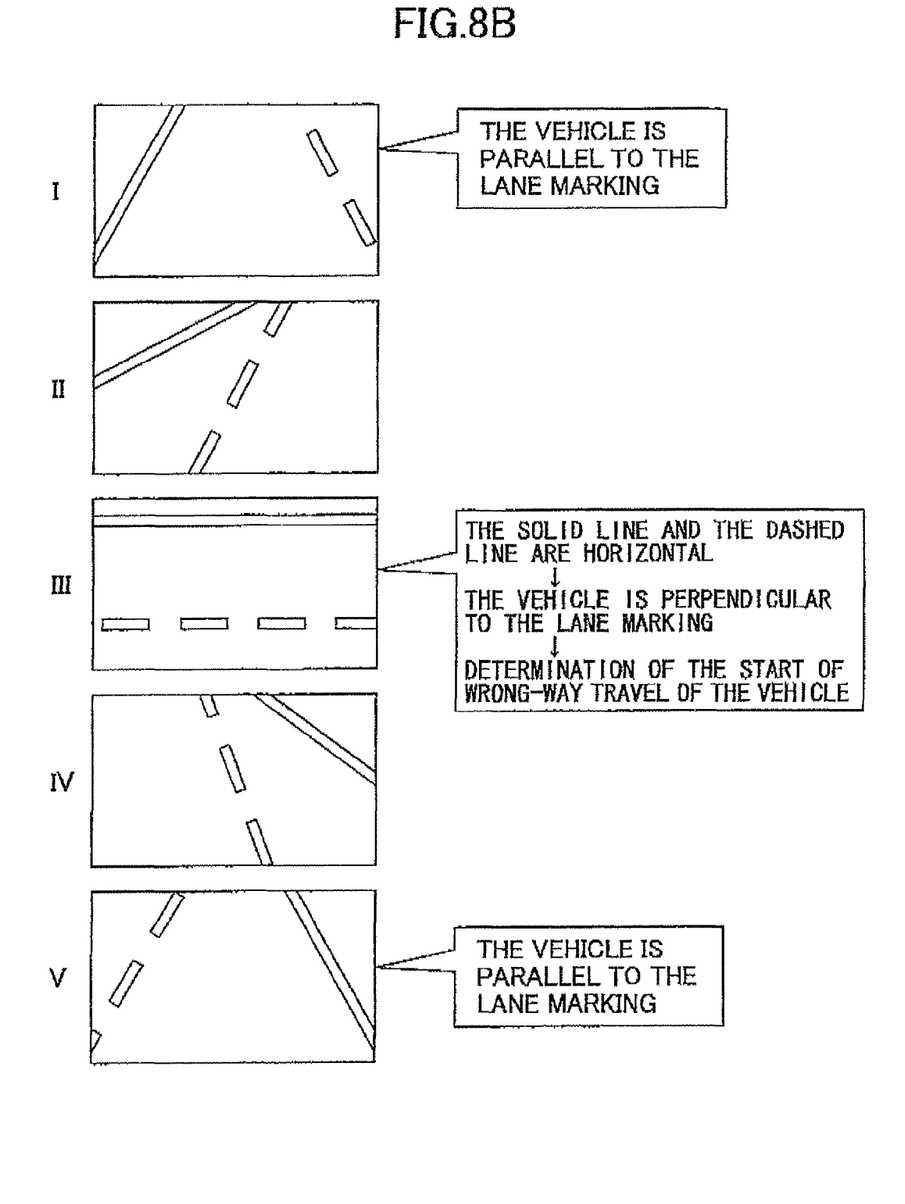
FIG. 8B is a diagram showing an example of image data during the U-turn of the vehicle.

FIG. 8A diagrammatically shows a process in which a vehicle makes a U-turn. FIG. 8B shows an example of image data captured during the U-turn of the vehicle. In FIG. 8A, a state at the time when the vehicle speed became less than the vehicle speed determining threshold value $V_0$ is represented as a state "I". As the vehicular longitudinal direction of the vehicle is nearly parallel to the lane marking in the state "I", similar to FIG. 6B, the lane marking looks like an inverted V shape in the image data.

If the vehicle continues the U-turn, the lane marking in the image data rotates in a clockwise direction and is directed in the horizontal direction in the state "III". That is, in the state "III", the vehicular longitudinal direction of the vehicle and the lane marking are at right angles, and the yaw angle becomes 90 degrees. If the vehicle further continues the U-turn, a state of the vehicle in FIG. 8A becomes a state "V" by way of a state "IV". In conjunction with this, the lane marking in the image data rotates in a clockwise direction and again looks like an inverted V shape in the state "V".

Referring back to FIG. 7, the wrong-way-travel determining part 31 repeatedly determines whether the yaw angle exceeds the turnaround determining threshold value $\theta_0$ unless the vehicle speed exceeds the vehicle speed determining threshold value $V_0$ (S55). If the turnaround determining threshold value $\theta_0$ is set to 90 degrees, the wrong-way-travel determining part 31 detects that there is a possibility of a wrong-way-travel of the vehicle in the state "III" of FIG. 8A. Alternatively, if the turnaround determining threshold value $\theta_0$ is set to about 80 degrees, the wrong-way-travel determining part 31 will detect that there is a possibility of a wrong-way-travel earlier. Alternatively, if the turnaround determining threshold value $\theta_0$ is set to 100 degrees, the wrong-way-travel determining part 31 will detect that there is a possibility of a wrong-way-travel more reliably.

If the yaw angle exceeds the turnaround determining threshold value $\theta_0$ (YES in S55), the wrong-way-travel determining part 31 determines that there is a possibility that the vehicle may make a wrong-way-travel and then causes the alarm requesting part 32 to issue a warning to a driver via at least one of an auditory and a visual sense (S60).

The wrong-way-travel warning device 100 of the present embodiment detects whether there is a possibility of a wrong-way-travel based on the vehicular longitudinal direction (the yaw angle) obtained through an analysis of the vehicle speed and the image data only if the vehicle is on and traveling the main lane of the highway. Thus, the wrong-way-travel warning device 100 can issue a warning to a driver before or just after a start of the wrong-way-travel and prevent the wrong-way-travel on the highway from happening.

In the present embodiment, the wrong-way-travel warning device 100 detects the yaw angle as a numerical value from the image data and compares the yaw angle and the turnaround determining threshold value $\theta_0$. However, the wrong-way-travel warning device 100 may detect whether there is a possibility of a wrong-way-travel from, for example, the fact that the lane marking of the image data has become horizontal. As the fact that the lane marking of the image data has become horizontal can be detected from the image data only, it is possible to limit the cost increase. This is because there is no need to previously register the angle α formed by the captured lane marking and the reference line in relation to the yaw angle, in so far as the optical axis of the rearview camera 26 is perpendicular to a wheel axis. Alternatively, in this case, the wrong-way-travel warning device 100 may detect whether there is a possibility of a wrong-way-travel by detecting that the lane marking which had become horizontal has rotated further in a clockwise direction (a transition from the state "III" to the state "IV" in FIG. 8H). Setting the transition between states as an object to be determined can facilitate the prevention of a false detection.

FIG. 8 illustrates the present embodiment by using an example of a three-lane road. However, even in a single-lane road or a two-lane road, as the rearview camera 26 captures either a left or a right lane marking, the wrong-way-travel warning device 100 can similarly calculate the yaw angle or detect the fact that the lane marking of the image data has become horizontal. Even if the vehicle makes a K-turn, the lane marking inevitably becomes horizontal before a start of a wrong-way-travel. Thus, similar to the first embodiment, the wrong-way-travel warning device 100 of the present embodiment can detect whether there is a possibility of a wrong-way-travel regardless of the number of lanes.

The present international application claims priority from Japanese Patent Application No. 2008-103498 filed on Apr. 11, 2008, which is entirely incorporated herein by reference.

The invention claimed is:

1. A wrong-way-travel warning device for detecting a possibility of a wrong-way-travel at a vehicle speed less than or equal to a predetermined value comprising:
   a part configured to detect a position of a vehicle;
   an angle detecting part configured to detect an angle of a vehicular longitudinal direction of the vehicle relative to a lane marking;
   a wrong-way-travel detecting part configured to detect a possibility of a wrong-way-travel if the position of the vehicle is on a main lane of a highway and if the angle becomes about 90 degrees; and
   a warning part configured to issue a warning to a vehicle occupant;
   wherein the angle detecting part is configured to detect the angle by temporal integrating a yaw rate while setting as a reference the vehicular longitudinal direction at the time when the vehicle speed becomes less than or equal to the predetermined value.

2. A wrong-way-travel warning device according to claim 1, further comprising:
a warning part configured to issue a warning to a vehicle occupant if the wrong-way-travel detecting part detects that there is a possibility of a wrong-way-travel.

3. A wrong-way-travel warning method for detecting a possibility of a wrong-way-travel at a vehicle speed less than or equal to a predetermined value, comprising the steps of:
detecting that a vehicle is traveling on a main lane of a highway;
detecting by an angle detecting part an angle of a vehicular longitudinal direction of the vehicle relative to a lane marking;
detecting by a wrong-way-travel detecting part that there is a possibility of a wrong-way-travel if the angle becomes about 90 degrees; and
issuing a warning to a vehicle occupant;
wherein the angle detecting part is configured to detect the angle by temporal integrating a yaw rate while setting as a reference the vehicular longitudinal direction at the time when the vehicle speed becomes less than or equal to the predetermined value.

* * * * *